United States Patent
Burch et al.

(10) Patent No.: US 6,219,825 B1
(45) Date of Patent: Apr. 17, 2001

(54) PROFILE BASED OPTIMIZATION OF SHARED LIBRARIES

(75) Inventors: Carl D. Burch, Mountain View; Rajiv Kumar, Santa Clara, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/370,963

(22) Filed: Jan. 10, 1995

(51) Int. Cl.$^7$ ........................................... G06F 9/45
(52) U.S. Cl. .................................... 717/4; 717/9
(58) Field of Search .......................... 395/700, 701, 395/702, 703, 705, 709, 710, 711; 364/280.4, 280.5, 973; 717/4, 5, 8, 9, 10, 11; 714/35, 38

(56) References Cited

U.S. PATENT DOCUMENTS

| | | | |
|---|---|---|---|
| 3,702,005 | * 10/1972 | Ingalls, Jr. ............................... | 444/1 |
| 5,212,794 | * 5/1993 | Pettis et al. ........................... | 395/700 |
| 5,247,681 | * 9/1993 | Janis et al. ........................... | 395/700 |
| 5,291,601 | * 3/1994 | Sands .................................... | 395/700 |
| 5,355,487 | * 10/1994 | Keller et al. ......................... | 395/650 |

OTHER PUBLICATIONS

Graham et al, "gprof: A Call Graph Execution Profiler", ACM, 5/82, pp. 120–126.*
Hall, R., "Call Path Profiling", ACM, 6/92, pp. 296–306.*

* cited by examiner

Primary Examiner—Kakali Chaki

(57) ABSTRACT

A method of operating a digital computer to provide instrumentation data for a shared library running in an environment in which programs are loaded and unloaded by a loader. The environment supports the operation of at least one program in addition to the shared library, the program utilizing at least one function provided by the shared library. The operating environment includes storage for a predetermined environment variable that may be read by any program running in the environment. The method includes the steps of causing the loader to examine the environment to determine if the predetermined environment variable has been set; and storing profile based optimization data stored in the shared library code in a location specified by the predetermined environmental variable if the predetermined environmental variable was present in response to a command being sent to the loader. The profile based optimization data is normally stored when the shared library is unloaded from the operating environment by the loader.

2 Claims, 1 Drawing Sheet

PROFILE BASED OPTIMIZATION OF SHARED LIBRARIES

FIELD OF THE INVENTION

The present invention relates to operating systems for digital computers, and more particularly, to operating systems for use with profile based optimization of computer code.

BACKGROUND OF THE INVENTION

Most computer systems utilize cache memories and the like to improve the performance of these systems while reducing the cost of the memory components. For example, when a program accesses a particular word of memory, the cache subsystem checks to see if the contents of that word are already stored in the cache. If the contents are stored in the cache, they are delivered to the processor. If not, the contents of that word as well as neighboring words are transferred to the cache subsystem. Since the cache subsystem has a much faster access time than the main memory of the computer this strategy substantially improves the run-time performance of the program. Other forms of hierarchical memory structures that operate in a manner analogous to cache memories are known to those skilled in the art, and hence, will not be discussed in detail here.

The degree of improvement provided by hierarchical storage systems depends on the degree of correlation of memory accesses. If there is a high probability that the next instruction to be executed after the currently executing instruction is stored close to the currently executing instruction in memory, the cache memory strategy will be more effective than if the next instruction is far from the current instruction. If computer code is always executed in a predetermined sequence, the compiler and linker sub-systems of the operating system could arrange the code such that the cache system operates at the optimum efficiency. Unfortunately, the vast majority of computer programs include branches and subroutine calls that interrupt the sequential nature of the code, and make it impossible for the compiler and linker to predict the instruction sequence from the code without additional information.

One method of obtaining the information needed to optimize the layout of the program is to use profile based optimization. In profile based optimization systems, the program code is run using representative test data and the sequence in which the code executes its instructions is determined. The operating sequence is determined by inserting instructions at key points in the code. These "instrumentation" instructions report data that may be used to determine the execution sequence of the program. This information is then used to rearrange the code so as to increase the correlation between memory accesses.

A computer program may be viewed as being separated into a plurality of basic blocks. A basic block is a sequence of instructions which contains no branches within the sequence. The basic block is entered from a branch and ends with a branch. Since the sequence of instructions within a basic block already operates with the maximum correlation in memory accesses, the profile based optimization system need only know the sequence with which the basic blocks are executed. This substantially reduces the number of instrumentation instructions that are needed to determine the sequence in which instructions actually execute when the program runs with real data. In addition to instrumenting the basic blocks, profile based optimization systems also typically instrument procedure calls.

In profile based optimization systems, the program is first compiled with options that lead to the insertion of the instrumentation code. The resulting executable code is run with sample data. The reports from the instrumentation instructions are stored in a data base which keeps track of the transfer of control among the basic blocks. After the execution of the instrumented program is complete, the data is used by an optimizer to rearrange the order in which the basic blocks are stored in memory. The rearrangement assures that when a first basic block often calls a second basic block, the two basic blocks are stored close to one another in memory.

While profile based optimization systems have been successfully utilized with conventional programs, the use of these techniques with shared libraries, or dynamic load libraries, has been hampered by the differences in which these two classes of programs are used. For the purposes of this discussion, a shared library will be defined to be one or more program libraries that may be accessed from a number of different programs in multi-tasking systems. These libraries are sometimes referred to as dynamic load libraries (DLLs). These libraries may be part of the operating system. Other service programs that are designed to be called by programs in a particular operating environment will also be apparent to those skilled in the art. For example, a spread sheet or word processing program may be setup as a shared library so that it may be launched by a client program to provide a function required by the client program. For example, the client program may call the word processing program to generate a printout of a document in that word processing program's format.

Shared libraries differ from simple client programs in that the library may not be loaded at the time the client program is loaded. Similarly, the library may not be unloaded when the client program is finished. Instrumentation of the shared library is also complicated by the fact that the library may be needed to service other programs while its instrumented version is being run with profiling data. If the instrumented library does not support multiple instances of the library operating simultaneously, the system may need to be shut down to load the instrumented version.

Broadly, it is the object of the present invention to provide an improved method for operating a computer to provide profile based optimization data for a shared library.

It is a further object of the present invention to provide a method for obtaining profile based optimization data that allows the instrumentation functions to be externally controlled.

These and other objects of the present invention will become apparent to those skilled in the art from the following detailed description of the invention and the accompanying drawings.

SUMMARY OF THE INVENTION

The present invention is a method of operating a digital computer to provide instrumentation data for a shared library running in an environment in which programs are loaded and unloaded by a loader. The environment supports the operation of at least one program in addition to the shared library, the program utilizing at least one function provided by the shared library. The operating environment includes storage for a predetermined environment variable that may be read by any program running in the environment. The method includes the steps of causing the loader to examine the environment to determine if the predetermined environment variable has been set; and storing profile based optimization data stored in the shared library code in a location specified by the predetermined environmental variable if the predetermined environmental variable was present in response to a command being sent to the loader. The profile based optimization data is normally stored when the shared library is unloaded from the operating environment by the loader.

DETAILED DESCRIPTION OF THE INVENTION

Figure 1:
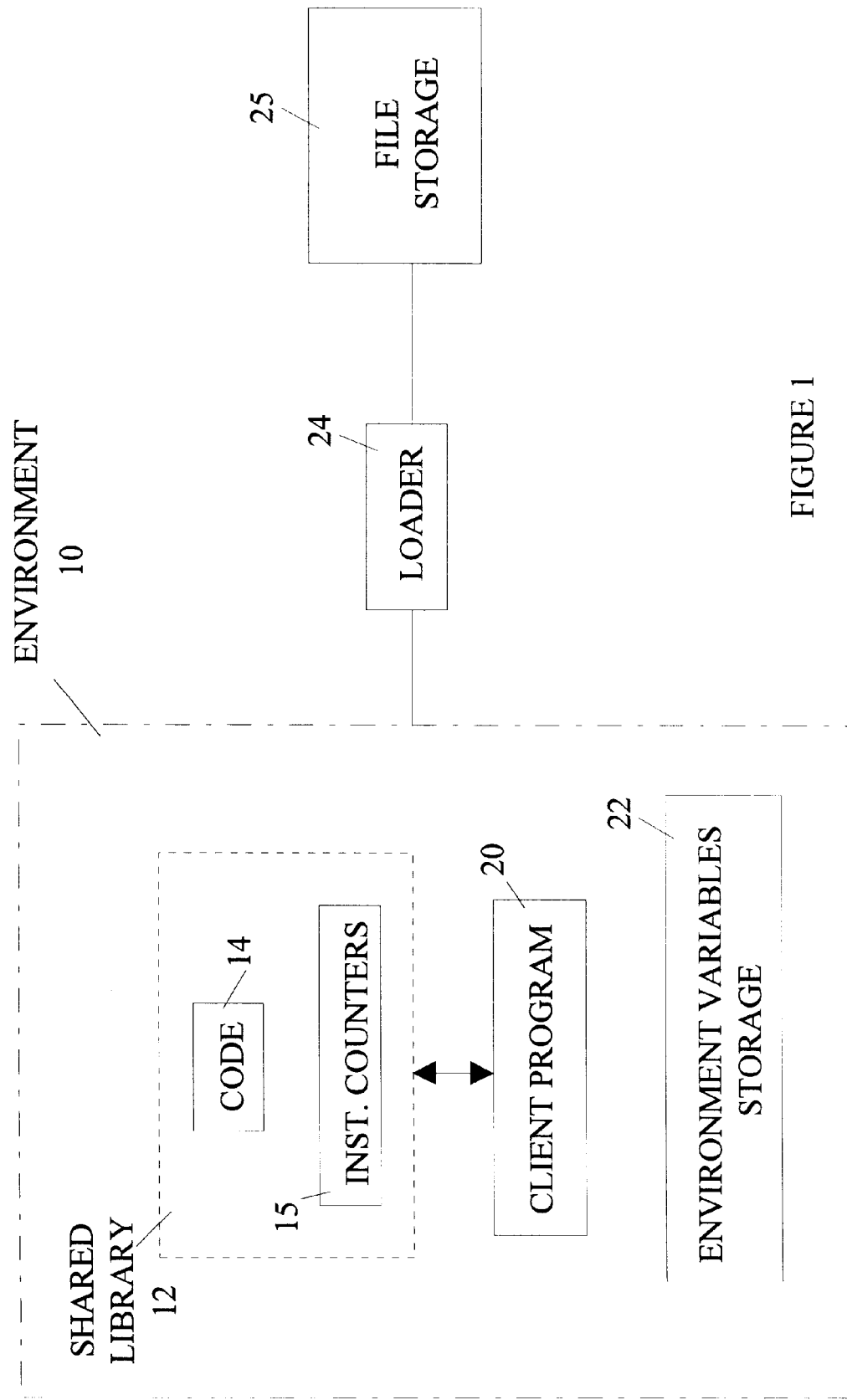
FIG. 1 illustrates the manner in which the preferred embodiment of the present invention operates.

In the present invention, the instrumentation is inserted into the shared library code in a manner analogous to that used in conventional programs. At compilation, a compiler directive is used to indicate that the instrumentation code is to be inserted. In systems that utilize intermediate code, the instrumentation directive may be given to the linker subsystem that converts the intermediate code to executable code. In either case, the instrumentation code is inserted in the shared library code prior to the shared library being loaded into memory.

Refer now to FIG. 1 which illustrates the manner in which the preferred embodiment of the present invention operates. Programs typically execute in a region of the computer memory referred to as the environment in the following discussion. The shared library 12 includes its normal code 14 and a set of instrumentation counters 15 that were placed in the executable code for the shared library by the compiler. Code for incrementing these counters when control is transferred between the various basic blocks and procedures was also placed in the code section 14 of the shared library by the compiler. One of these counters is incremented each time the corresponding basic blocks are executed. The counters are loaded with zero by the linker and the instrumentation code operates whenever the shared library is run whether or not the shared library is running with test data.

The shared library is loaded into memory by a loader 24 in response to one of the routines in the library being called by a client program 20. If the shared library is part of the operating environment, the shared library will be loaded with the operating shell. The operating environment includes a memory area 24 in which various environmental variables are stored. These variables are typically used to communicate with programs operating in the environment.

The shared library may be unloaded in response to a number of conditions. For example, the calling program may execute a specific exit routine that instructs the loader to unload the shared library. Alternately, the shared library may be unloaded when the operating shell is shut down or in response to a command from the system operator. In any event, when the shared library is unloaded, loader 24 determines if the shared library has been instrumented. If the shared library was instrumented, the loader then determines if the counter values associated with the instrumentation are to be saved.

In the preferred embodiment of the present invention loader 24 examines a predetermined environmental variable to determine if the counter values are to be saved. The environmental variable specifies a disk file in file storage area 25 to be used for saving the values. If the disk file already exists, the new counter values are added to those already in the disk file. If the disk file does not exist, a new file is created. If the environmental variable in question is not set, the loader merely ignores the counter values stored in the instrumentation code.

It should be noted that an shared library according to the present invention will function normally for all processes that use it; although, it will function somewhat slower. This allows system libraries to be profiled without disrupting the normal operation of the system.

Various modifications to the present invention will become apparent to those skilled in the art from the foregoing description and accompanying drawings. Accordingly, the present invention is to be limited solely by the scope of the following claims.

What is claimed is:

1. A method of operating a digital computer to provide instrumentation data for a shared library running in an environment in which programs are loaded and unloaded by a loader, said environment supporting the operation of at least one program in addition to said shared library, said program utilizing at least one function provided by said shared library, said environment including means for storing a predetermined environment variable that may be read by any program running in said environment, said method comprising the steps of:

causing said loader to examine said environment to determine if said predetermined environment variable has been set; and storing profile based optimization data stored in said shared library code in a location specified by said predetermined environmental variable if said predetermined environmental variable was present in response to a command being sent to said loader.

2. The method of claim 1 wherein said command is issued as a part of a sequence of commands executed when said loader unloads said shared library.

* * * * *